(12) United States Patent
Wurth et al.

(10) Patent No.: US 11,821,580 B2
(45) Date of Patent: Nov. 21, 2023

(54) ELEVATOR GUIDE RAIL BLOCK ASSEMBLY

(71) Applicant: Wurtec, Incorporated, Toledo, OH (US)

(72) Inventors: Steven P. Wurth, Sylvania, OH (US); Christopher D. Blessing, Toledo, OH (US); Jeffrey A. Wagenhauser, Lambertville, MI (US); Colton J. Hughson, Dundee, MI (US)

(73) Assignee: Wurtec, Incorporated, Toledo, OH (US)

( * ) Notice: Subject to any disclaimer, the term of this patent is extended or adjusted under 35 U.S.C. 154(b) by 0 days.

(21) Appl. No.: 17/832,013

(22) Filed: Jun. 3, 2022

(65) Prior Publication Data

US 2022/0390066 A1 Dec. 8, 2022

Related U.S. Application Data

(60) Provisional application No. 63/196,286, filed on Jun. 3, 2021.

(51) Int. Cl.
*F16M 13/02* (2006.01)
*B66B 5/00* (2006.01)
*B66B 19/00* (2006.01)

(52) U.S. Cl.
CPC ......... *F16M 13/022* (2013.01); *B66B 5/0087* (2013.01); *B66B 19/00* (2013.01)

(58) Field of Classification Search
CPC ...... F16M 13/022; B66B 5/0087; B66B 19/00
See application file for complete search history.

(56) References Cited

U.S. PATENT DOCUMENTS

| | | | |
|---|---|---|---|
| 5,931,263 A | 8/1999 | Ericson et al. | |
| 9,663,327 B2 * | 5/2017 | Terry | B66B 5/20 |
| 2008/0128218 A1 * | 6/2008 | Gremaud | B66B 5/22 187/250 |
| 2011/0308895 A1 * | 12/2011 | Shen | B66B 5/18 187/359 |
| 2013/0081908 A1 | 4/2013 | Meierhans et al. | |
| 2013/0248298 A1 | 9/2013 | Osmanbasic et al. | |
| 2019/0092603 A1 | 3/2019 | Marante-Chasco | |
| 2019/0168996 A1 * | 6/2019 | Keller | B66B 5/0087 |
| 2020/0339386 A1 * | 10/2020 | Wurth | F16G 11/06 |

FOREIGN PATENT DOCUMENTS

WO 2021036398 A1 3/2021

OTHER PUBLICATIONS

Written Opinion of the International Searching Authority dated Aug. 24, 2022.

* cited by examiner

*Primary Examiner* — Monica E Millner
(74) *Attorney, Agent, or Firm* — Jacob M. Ward; Ward Law Office LLC

(57) ABSTRACT

An elevator guide rail block assembly configured for use with an elevator car or counterweight guide rail is provided. The elevator guide rail block assembly includes a framework and a plurality of rotatable cams attached to the framework. An actuator element is configured to actuate rotation of the plurality of rotatable cams. A clamp structure is attached to the framework and spaced apart from the plurality of rotatable cams. In a rotated orientation, the combination of the plurality of rotatable cams and the clamp structure form a clamping action configured to secure the elevator guide rail block assembly to an elevator car or counterweight guide rail.

17 Claims, 11 Drawing Sheets

ELEVATOR GUIDE RAIL BLOCK ASSEMBLY

This application claims the benefit of U.S. Provisional Application No. 63/196,286 filed on Jun. 3, 2021. The entire disclosure of the above application is incorporated herein by reference.

FIELD

The present disclosure relates generally to tooling used in the construction and repair of vertical transportation equipment, namely elevators, and more particularly, to devices configured to temporarily hang or suspend elements from the car or counterweight guide rails.

INTRODUCTION

This section provides background information related to the present disclosure which is not necessarily prior art.

An elevator is a type of vertical transportation equipment that efficiently moves people and/or goods between floors, levels and/or decks of a building, vessel or other structure. One type of elevator is called a traction elevator. Traction elevators use geared or gearless traction machines to drive suspension elements connected on one end to an elevator car and connected on the opposite end to a counterweight. In certain instances, the suspension elements are wire ropes.

The elevator car and the counterweight are located within a portion of the building referred to as a hoistway. The geared or gearless machines are driven by electric motors.

Typically, the elevator car moves in a vertical direction within opposing car guide rails and the counterweight moves in an opposing vertical direction within opposing counterweight guide rails. Often, the placement of the car and counterweight guide rails are such that the elevator car and the counterweight can be in close proximity to each other.

In certain instances, such as for example construction, installation and/or maintenance of the elevator elements with the hoistway, it can be desirable to temporarily hang or suspend elements from the car or counterweight guide rails. Structures and devices to temporarily engage a car or counterweight guide rails are known in the art. However, these structures and devices can be heavy requiring more than a single person to implement, time consuming to install and can have limited loading capacities.

It would be advantageous if the structures and devices configured to temporarily engage a car or counterweight guide rails could be improved.

SUMMARY

It should be appreciated that this Summary is provided to introduce a selection of concepts in a simplified form, the concepts being further described below in the Detailed Description. This Summary is not intended to identify key features or essential features of this disclosure, not is it intended to limit the scope of the elevator guide rail block assembly.

The above objects as well as other objects not specifically enumerated are achieved by an elevator guide rail block assembly configured for use with an elevator car or counterweight guide rail. The elevator guide rail block assembly includes a framework and a plurality of rotatable cams attached to the framework. An actuator element is configured to actuate rotation of the plurality of rotatable cams. A clamp structure is attached to the framework and spaced apart from the plurality of rotatable cams. In a rotated orientation, the combination of the plurality of rotatable cams and the clamp structure form a clamping action configured to secure the elevator guide rail block assembly to an elevator car or counterweight guide rail.

The above objects as well as other objects not specifically enumerated are also achieved by a method of using an elevator guide rail block assembly configured for use with an elevator car or counterweight guide rail. The method includes the steps of aligning a gap formed in the elevator guide rail block assembly with a flange of an elevator car or counterweight guide rail, the gap formed between a plurality of rotatable cams arranged in a framework and a clamp structure abutting the framework, engaging the flange of elevator car or counterweight guide rail with the elevator guide rail block assembly in a manner such that the elevator car or counterweight guide rail seats against the framework, clamping the flange of the elevator car or counterweight guide rail between the plurality of rotated cams and the clamp structure, thereby securing the elevator guide rail block assembly to the elevator car or counterweight guide rail.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
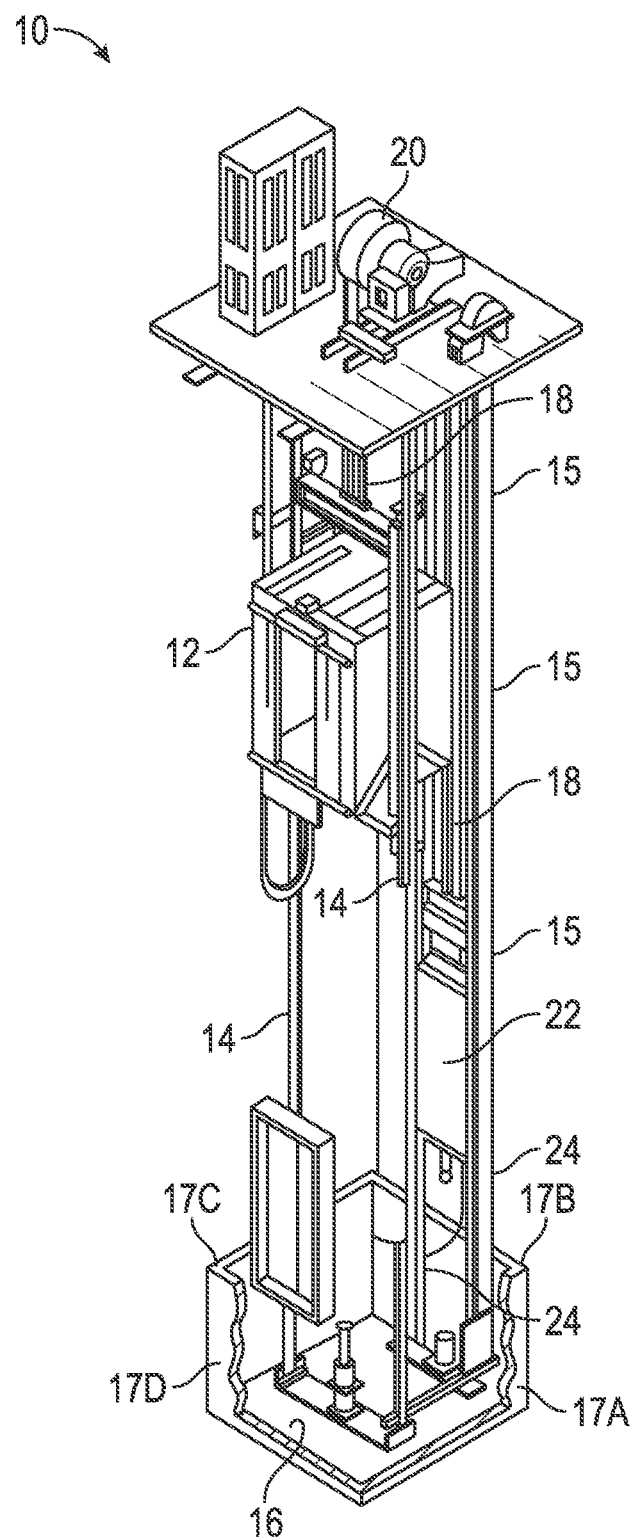
FIG. 1 is a perspective schematic illustration, partially in phantom, of a conventional elevator.
Figure 2:
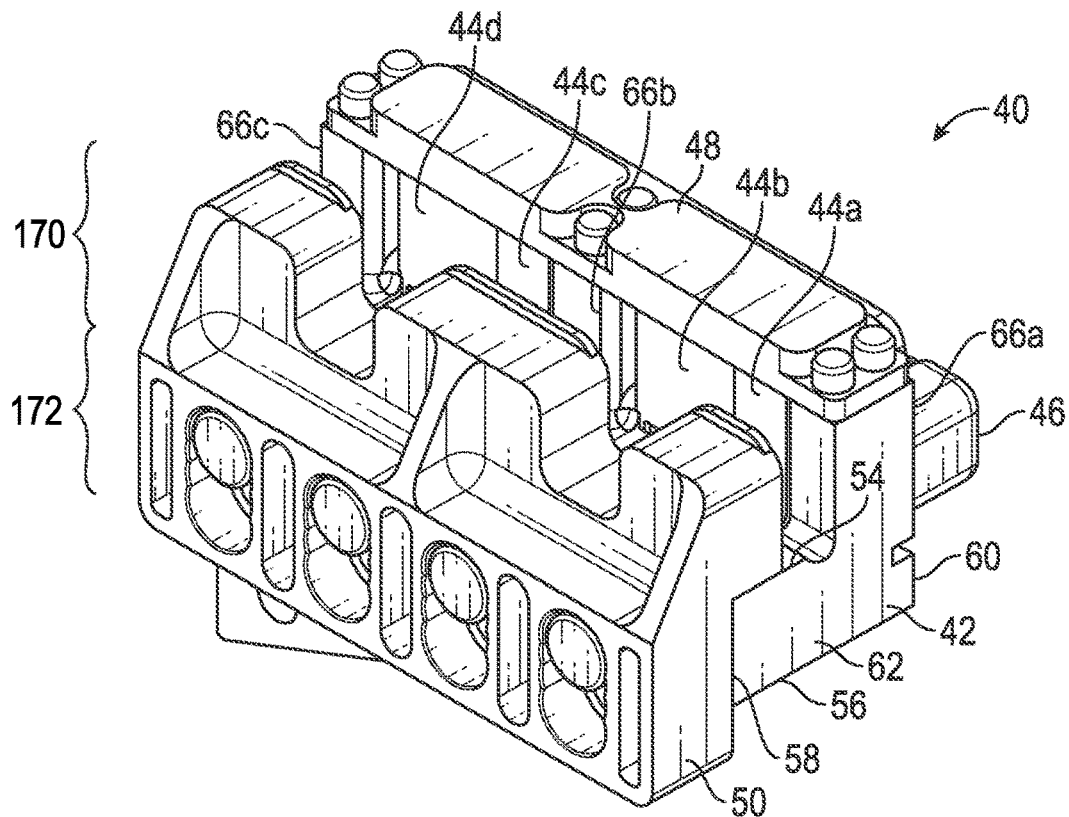
FIG. 2 is a right-side perspective view of a novel elevator guide rail block assembly.
Figure 3:
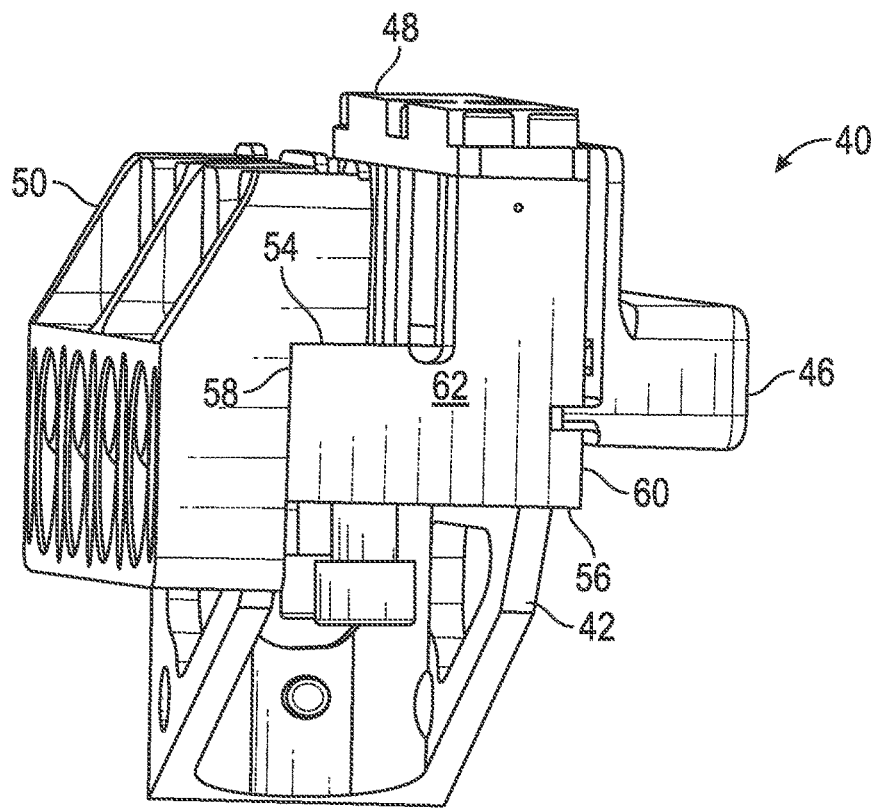
FIG. 3 is a front perspective view of the elevator guide rail block assembly of FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the illustrated embodiments of the present disclosure, an elevator guide rail block assembly is provided. Generally, the elevator guide rail block assembly is configured to establish a secure and sturdy, removable connection with a car or counterweight guide rail. Once the elevator guide rail block assembly is secured to the car or counterweight guide rail, the elevator guide rail block assembly can be used to temporarily hang, suspend and/or hoist elements from the car or counterweight guide rails. The removable connection of the elevator guide rail block assembly to the car or counterweight guide rail is such that the elevator guide rail block assembly can be moved to another location on the car or counterweight guide rail and a new secure and sturdy connection can be quickly established.

Referring now to the drawings, there is illustrated in FIG. 1 a diagrammatic and simplified view of an elevator 10. The elevator 10 is conventional in the art and will only be briefly described herein. The elevator 10 includes an elevator car 12 moving in a substantially vertical direction on opposing car guide rail stacks 14. Each stack of car guide rails 14 is formed by a plurality of individual car guide rails 15 (also commonly called main rails) formed in an end-to-end stacked arrangement. The opposing car guide rail stacks 14 are disposed in the elevator hoistway 16. In the illustrated embodiment, the hoistway 16 is defined by cooperating hoistway walls 17a-17d. However, it should be appreciated that in other embodiments, the hoistway 16 can be defined by other structures, assemblies and components, such as the non-limiting example of structural divider beams and the like. The elevator car 12 is supported at one end of one or more suspension ropes 18, which are moved with an elevator machine 20. The other end of the one or more suspension ropes 18 is connected to a counterweight assembly 22. The counterweight assembly 22 is configured to balance a portion of the weight of the elevator rails and moves in a substantially vertical direction within a plurality of individual counterweight guide rails 24 formed in an end-to-end stacked arrangement. In certain instances, it can be desirable to temporarily hang or suspend elements from the car or counterweight guide rails. Non-limiting examples of those instances include lifting loads within the elevator hoistway 16, assembling, servicing and/or repairing the elevator car 12 and supporting cross-structures within the elevator hoistway 16.

Referring now to FIGS. 2-6, a first embodiment of an elevator guide rail block assembly (hereafter "block assembly") is illustrated generally at 40. The block assembly 40 includes a framework 42, a plurality of cams 44a-44d mounted for rotation, an actuator element 46, a retention element 48 and a clamp structure 50.

Referring now to FIGS. 2-8, the framework 42 has a longitudinal axis A-A and includes a base element 52 having a first face 54, an opposing second face 56, a first side 58, an opposing second side 60, a first end 62 and an opposing end 64. A plurality of spaced apart support elements 66a-66c extend in a generally perpendicular direction from the first face 54 and each are positioned proximate the second side 60. Each of the support elements 66a-66c has a distal end 68a-68c respectively. Each of the distal ends 68a-68c includes a plurality of threaded apertures 70a-70f. The threaded apertures 70a-70f will be discussed in more detail below.

Figure 7:
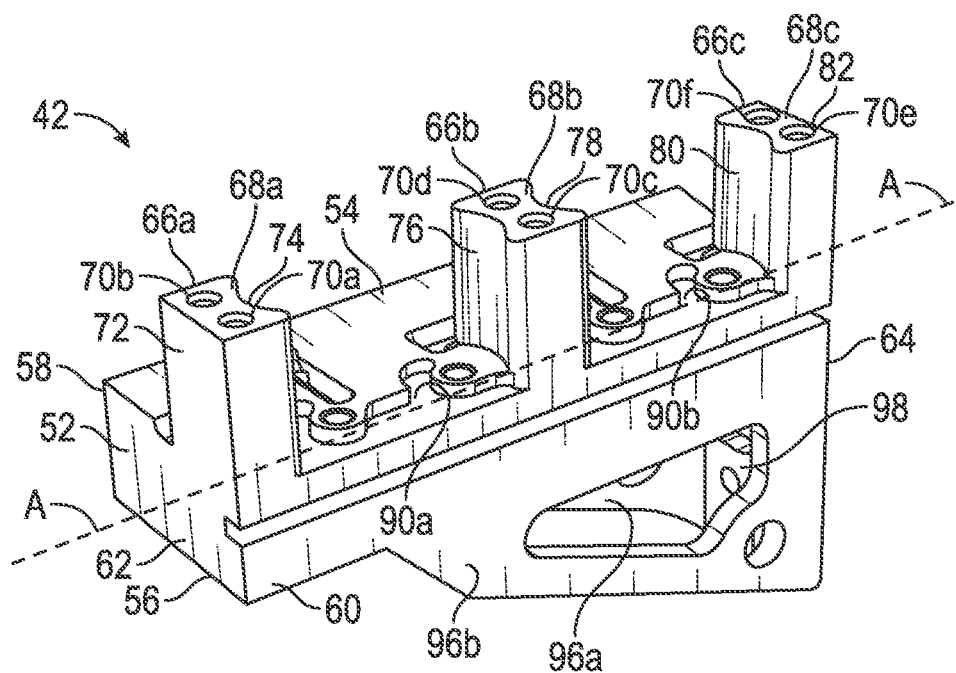
FIG. 7 is a left-side perspective view of the framework of the elevator guide rail block assembly of FIG. 5.
Figure 8:
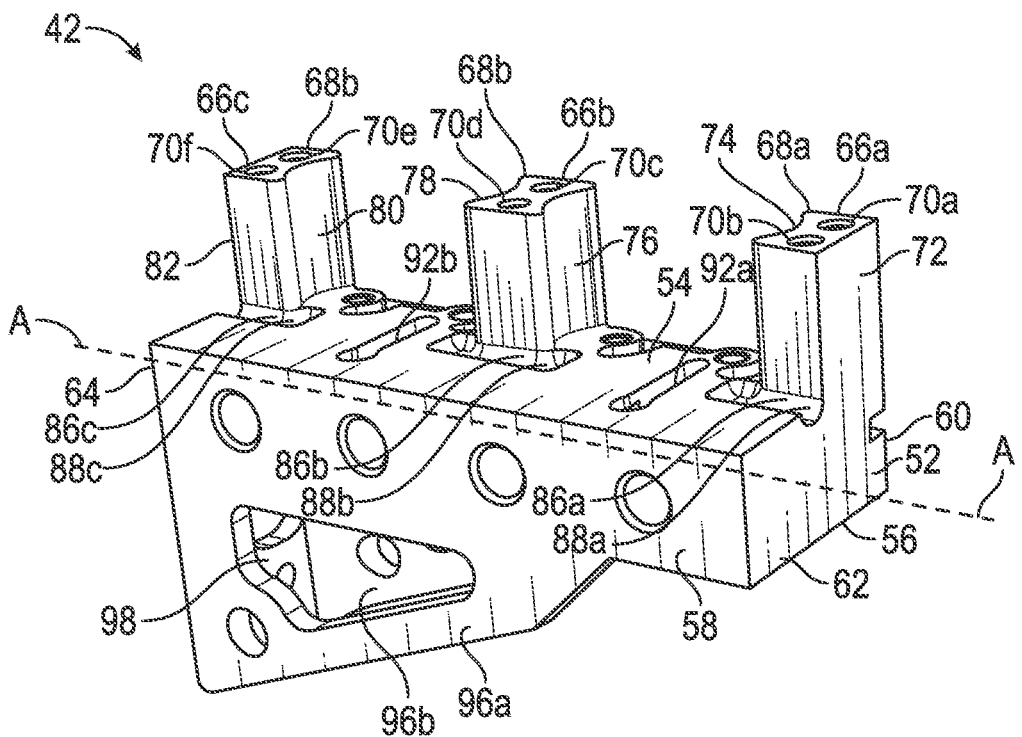
FIG. 8 is a right-side perspective view of the framework of the elevator guide rail block assembly of FIG. 7.

Referring now to FIGS. 7 and 8, the support element 66a includes a first, flat face 72 and an opposing second, arcuate face 74. The support element 66b includes a first, arcuate face 76 and an opposing second, arcuate face 78 and the support element 66c, includes a first, arcuate face 80 and an opposing, second flat face 82. As will be explained in more detail below, the arcuate faces 74, 76, 78 and 80 have a diameter that approximates a diameter of the cams 44a-44d and are positioned proximate the cams 44a-44d.

Referring now to FIG. 8, an optional first recess 86a is positioned adjacent a first intersection 88a of the support element 66a and the first face 54. Similarly, an optional second recess 86b is positioned adjacent a second intersection 88b of the support element 66b and the first face 54 and an optional third recess 86c is positioned adjacent a third intersection 88c of the support element 66c and the first face 54. Without being held to the theory, it is believed the recesses 86a-86c operate to effectively distribute stresses incurred between the support elements 66a-66c and the first face 54. While the embodiment of the framework 42 shown in FIGS. 7 and 8 includes the recesses 86a-86c, it is contemplated that in other embodiments, the stresses incurred between the support elements 66a-66c and the first face 54 can be distributed by other structures, mechanisms, devices and methods.

Referring now to FIG. 7, the first face 54 includes a first arcuate recess 90a positioned proximate the support element 66b and a second arcuate recess 90b positioned proximate the support element 66c. As will be explained in more detail below, the first and second recesses 90a, 90b are configured to guide and provide a hard stop for portions of the cams 44b, 44d during rotation of the cams 44a-44d. While the embodiments of the first and second recesses 90a, 90b provided in FIG. 8 are shown as having an arcuate cross-sectional shape, in other embodiments, the first and second recesses 90a, 90b can have other cross-sectionals shapes sufficient for the functions described herein.

Referring again to FIG. 8, the first face 54 also includes a first spring recess 92a and a second spring recess 92b. The first and second spring recesses are configured to receive actuation springs (not shown for purposes of clarity). In the illustrated embodiment, the first and second spring recesses 92a, 92b have a parallel relationship and are each orientated in a perpendicular arrangement with the longitudinal axis A-A. However, in other embodiments, the first and second spring recesses can have other relative relationships and can be oriented at acute angles to the longitudinal axis A-A.

Figure 6:
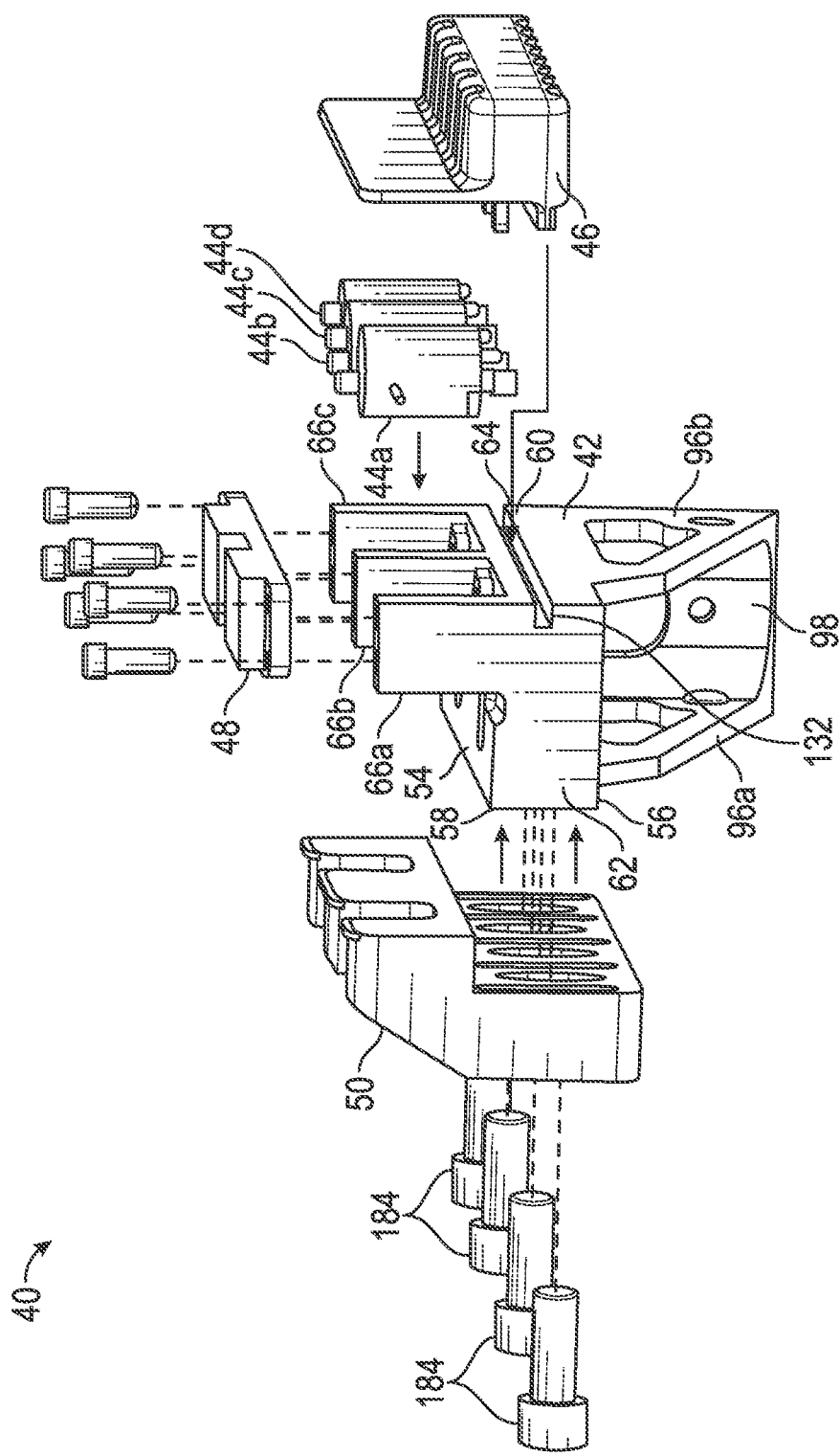
FIG. 6 is an exploded view of the elevator guide rail block assembly of FIG. 1.

Referring now to FIGS. 6-8, a first side wall 96a extends from the second face 56 of the base element 52 in a generally planar direction with the first side 58. Similarly, a second side wall 96b extends from the base element 52 in a generally planar direction with the second side 60. A rear wall 98 extends from the second end 64 of the base element 52 in a generally planar direction with the second end 64 and connects the first and second side walls 96a, 96b. The combination of the walls 96a, 96b, 98 is configured to provide structural support to the block assembly 40 during use. In the illustrated embodiment, each of the first and second side walls 96a, 96b have a triangular shape and the rear wall 98 has a rectangular shape. In alternate embodiments, each of the walls 96a, 96b, 98 can have other shapes, sufficient to provide structural support to the block assembly 40 during use.

While the embodiment of the framework 42 shown in FIGS. 7 and 8 is represented as a unitary body, in other embodiments, the framework 42 can be formed from discrete components that are assembled together.

Figure 9:
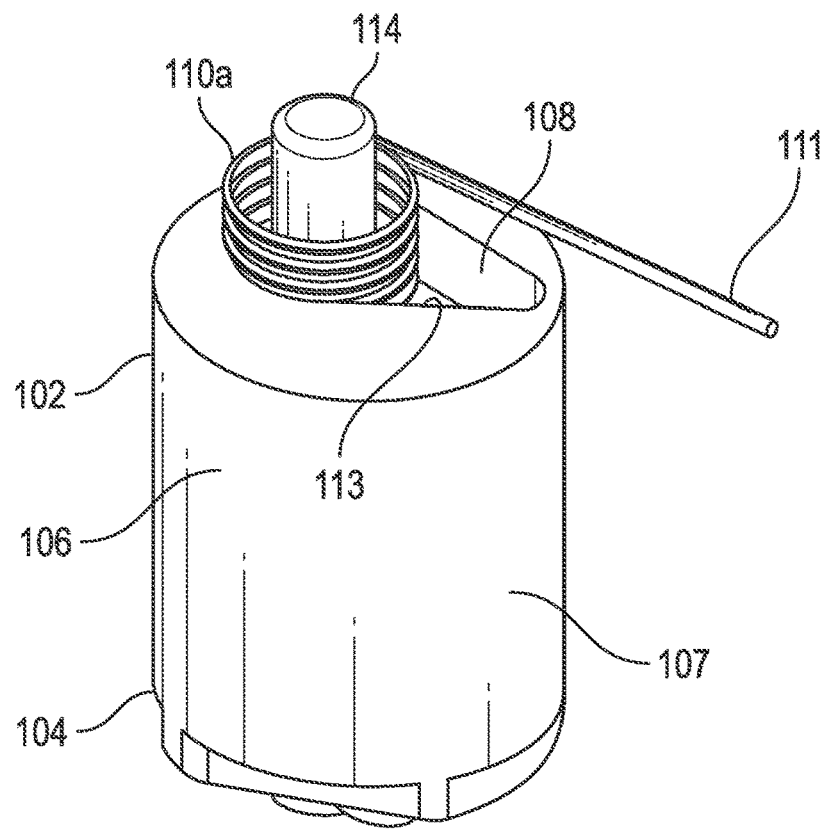
FIG. 9 is a right-side perspective view of a rotatable cam of the elevator guide rail block assembly of FIG. 2.
Figure 10:
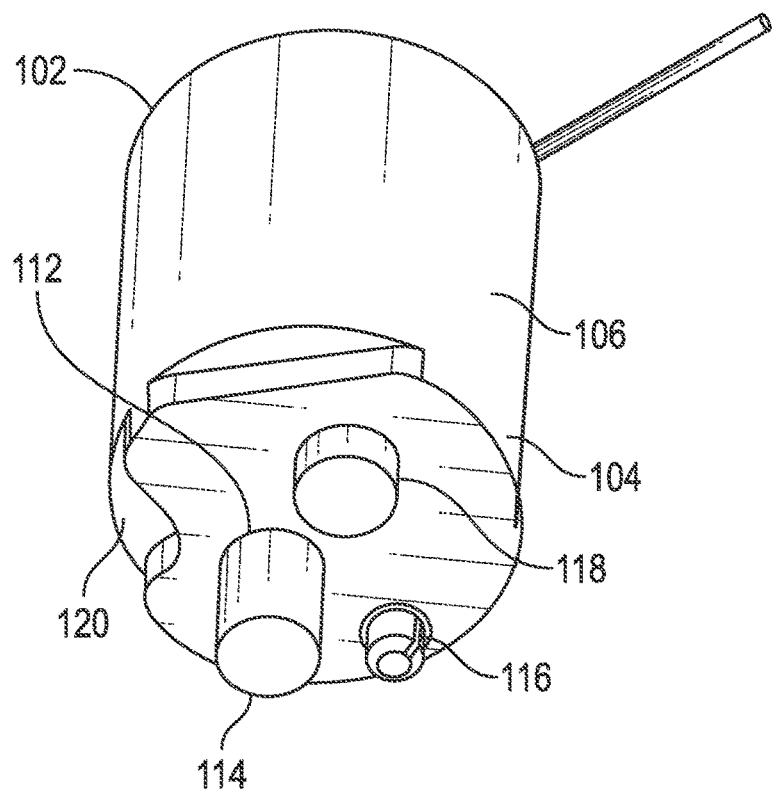
FIG. 10 is a bottom perspective view of a rotatable cam of the elevator guide rail block assembly of FIG. 9.

Referring now to FIGS. 9 and 10, the cam 44a is illustrated. Cam 44a is representative of the cams 44b-44d. Cam 44a has the form of an offset cylinder with a first end 102, an opposing second end 104, a circumferential surface 106 and a cam lobe 107. The term "cam lobe", as used herein, is defined to mean an asymmetric portion of the cam configured to seat against an elevator car or counterweight guide rail. A spring cutout 108 is position at the first end 102 and is configured to receive a first spring 110. A shaft aperture 112 extends from the first end 102 to the second end 104 and is configured to receive a cam shaft 114 that extends beyond the first and second ends 102, 104. A pin 116 extends from the second end 104 and is configured for connection with the actuator element 46 (FIG. 6). A protrusion 118 extends from the second end 104 and is configured for engagement with the first arcuate recess 90*a* of the base element 52. A cutout 120 is positioned in second end 104. The cutout 120 will be discussed in more detail below.

Figure 13:
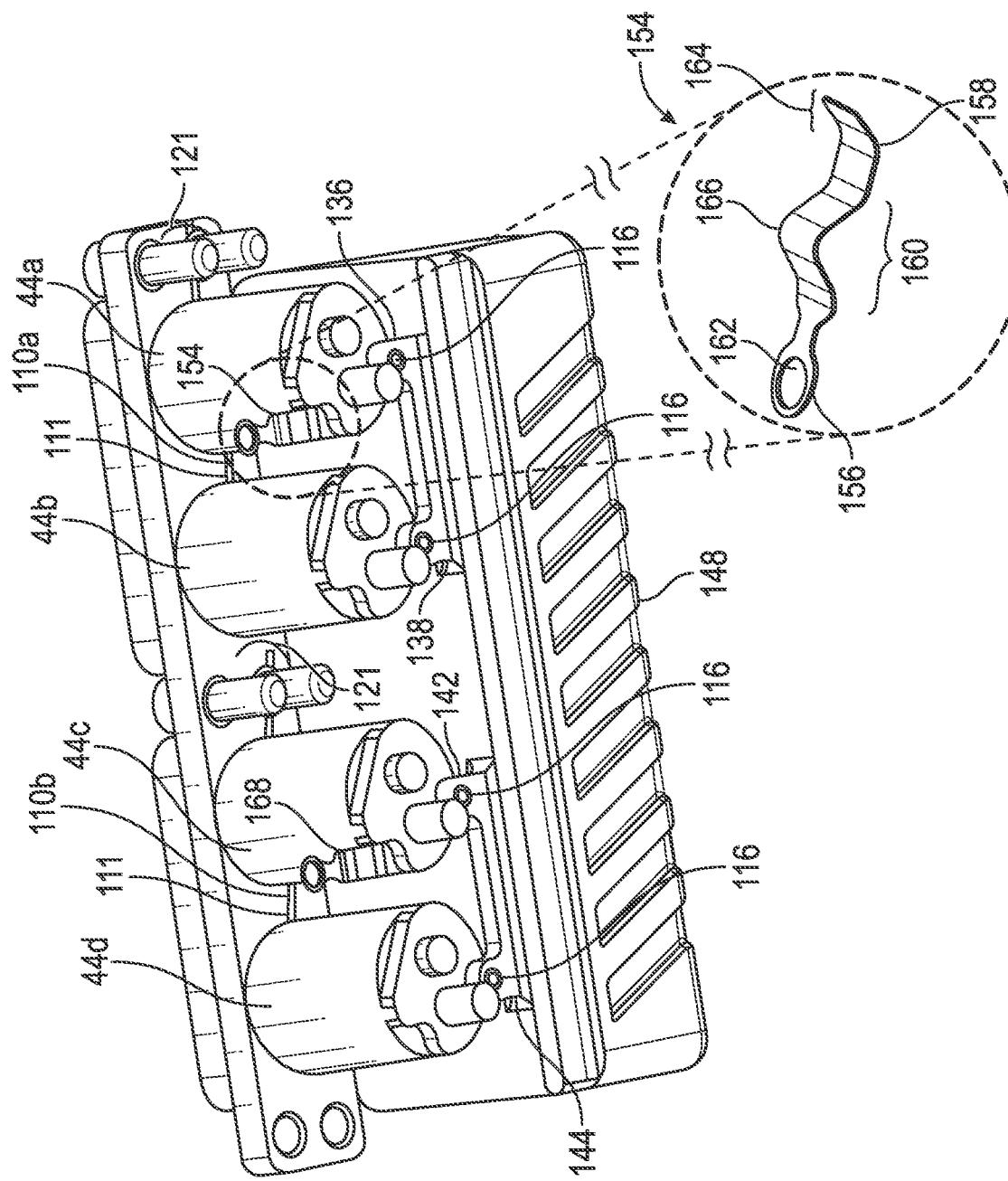
FIG. 13 is a right-side perspective view of the rotatable cams of FIG. 9 and the actuator element of FIG. 11.

Referring now to FIGS. 9, 10 and 13, a first cam spring 110*a* is illustrated. The cam spring 110*a* is representative of a second cam spring 110*b*. The first and second cam springs 110*a*, 110*b* are configured to urge the cam lobes 107 of the cams 44*a*-44*d* into contact with a face of a car or counterweight guide rail, thereby applying a load to the applied face of the car or counterweight guide rail. Each of the cam springs 110*a*, 110*b* include a first end 111 and a second end 113. The first end 111 is seated within a cutout 121 located on a mating surface of the retention element 48 and the second end 113 is seated within the cutout 108. In the illustrated embodiment, each of the first and second cam springs 110*a*, 110*b* have the form of a torsion spring. However, in other embodiments, each of the first and second cam springs 110*a*, 110*b* can have other forms sufficient to urge the cam lobes 107 of the cams 44*a*-44*d* into contact with a face of a car or counterweight guide rail, thereby applying a load to the applied face of the car or counterweight guide rail.

Figure 11:
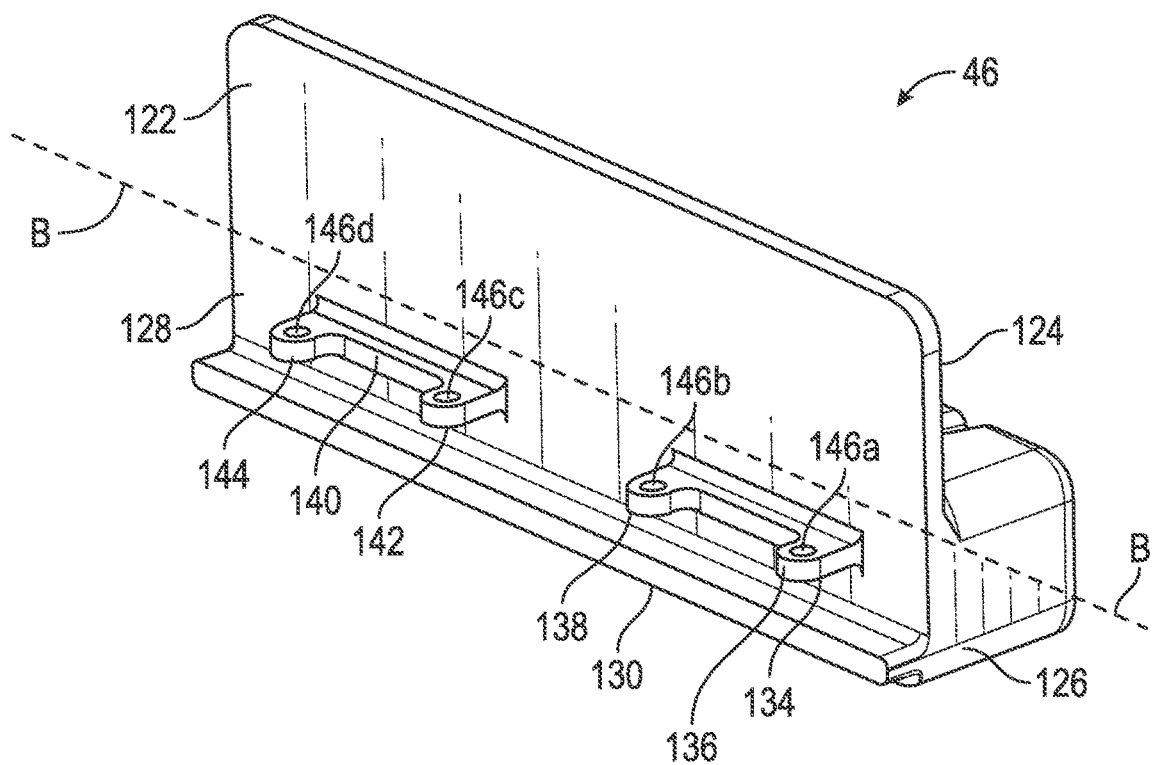
FIG. 11 is a right-side perspective view of an actuator element of the elevator guide rail block assembly of FIG. 2.
Figure 12:
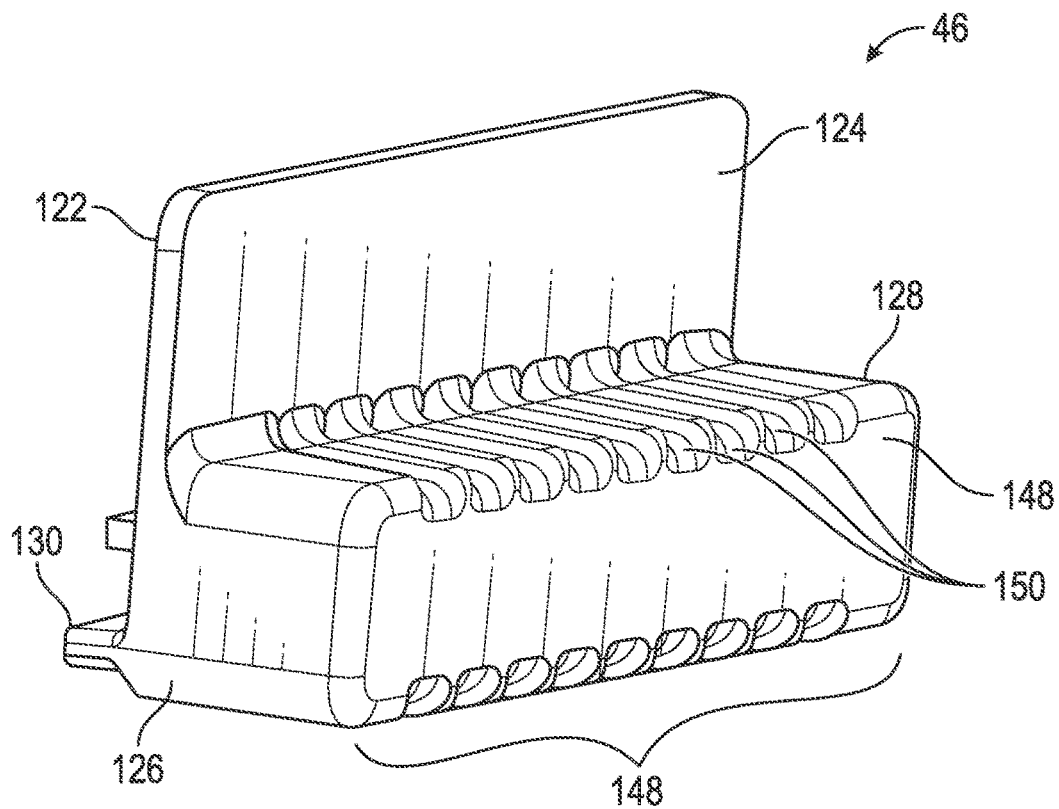
FIG. 12 is a left-side perspective view of the actuator element of FIG. 11.

Referring now to FIGS. 11 and 12, the actuator element 46 is illustrated. The actuator element 46 has a longitudinal axis B-B and includes an interior major surface 122, an opposing exterior major surface 124, a first end 126 and an opposing second end 128. A rail 130 extends from the first end 126 to the second end 128 along the interior major surface 122 and is arranged in a parallel relationship with the longitudinal axis B-B. In the illustrated embodiment, the rail 130 has a rectangular cross-sectional shape that approximates a size and cross-sectional shape of a longitudinal slot 132 located in the second side 60 of the base element 52 in a manner such that the actuator element 46 is slidable when seated against the base element 52. However, it should be appreciated that in other embodiments, the rail 130 and the associated slot 132 can have other complementary cross-sectional shapes.

Referring again to FIGS. 11 and 12, a first support segment 134 extends from the interior major surface 122 and includes a first arm 136 and a spaced apart second arm 138. Similarly, a second support segment 140 extends from the interior major surface 122 and includes a first arm 142 and a spaced apart second arm 144. The first and second support segments 134, 140 and first and second arms 136, 138, 140, 144 have a parallel relationship with the longitudinal axis B-B.

Referring now to FIG. 11, each of the first and second arms 136, 138, 140, 144 includes an aperture 146*a*-146*d*, respectively. Each of the apertures 146*a*-146*d* is configured to receive a pin 116 (FIG. 10) extending from an associated cam 44*a*-44*d*. As will be explained in more detail below, axial movement of the actuator element 46 results in axial movement of the first and second support segments 134, 140, which in turn, results in rotation of the cams 44*a*-44*d* about their respective cam shafts 114 and contact of the cam lobes 107 against an elevator car or counterweight guide rail.

Referring again to FIG. 12, a grip segment 148 extends from the exterior major surface 124. The grip segment 148 is configured for engagement with a hand of a user (not shown) for purposes of axially moving the actuator element 46. The grip segment 148 includes a plurality of surface features 150 configured to assist in the positive engagement with the user's hand. In the illustrated embodiment, the plurality of surface features 150 have the form of parallel, adjacent channels. In other embodiments, the plurality of surface features 150 can have other forms, including the non-limiting examples of cross-hatchings, protrusions, serrations and the like, sufficient to assist in the positive engagement with the user's hand.

While the embodiment of the actuator element 46 shown in FIGS. 11 and 12 is represented as a unitary body, in other embodiments, the actuator element 46 can be formed from discrete components that are assembled together.

Referring now to FIG. 13, the cams 44*a*-44*d* are shown in an assembled orientation with the actuator element 46. In this orientation, each of the pins 116 extending from the cams 44*a*-44*d* has seated in the adjacent first and second arms 136, 138, 142, 144 of the actuator element 46.

Referring again to FIG. 13, a first actuation spring 154 has a first end 156, an opposing second end 158 and an intermediate segment 160 positioned therebetween. The first end 156 includes an aperture 162 configured to receive a fastener (not shown) for attachment to the base element 52. In an installed position, the first actuation spring 154 is seated within the first spring recess 92*a*. The second end 158 of the first actuation spring 154 includes an upwardly oriented segment 164. In an installed position, the upwardly oriented segment 164 seats within the cutout 120 of the cam 44*a* in a manner such as to prevent rotation of the cam 44*a*. The intermediate segment 160 includes a mounded portion 166. In an installed position, the mounded portion 166 of the first actuation spring 154 is positioned above a plane defined by the first face 54 of the base element 52.

Referring again to FIG. 13, a second actuation spring 168 has the same or similar structure as the first actuation spring 154 and is configured to engage the cam 44*c* in the same manner as described above for the first actuation spring 154.

Figure 14:
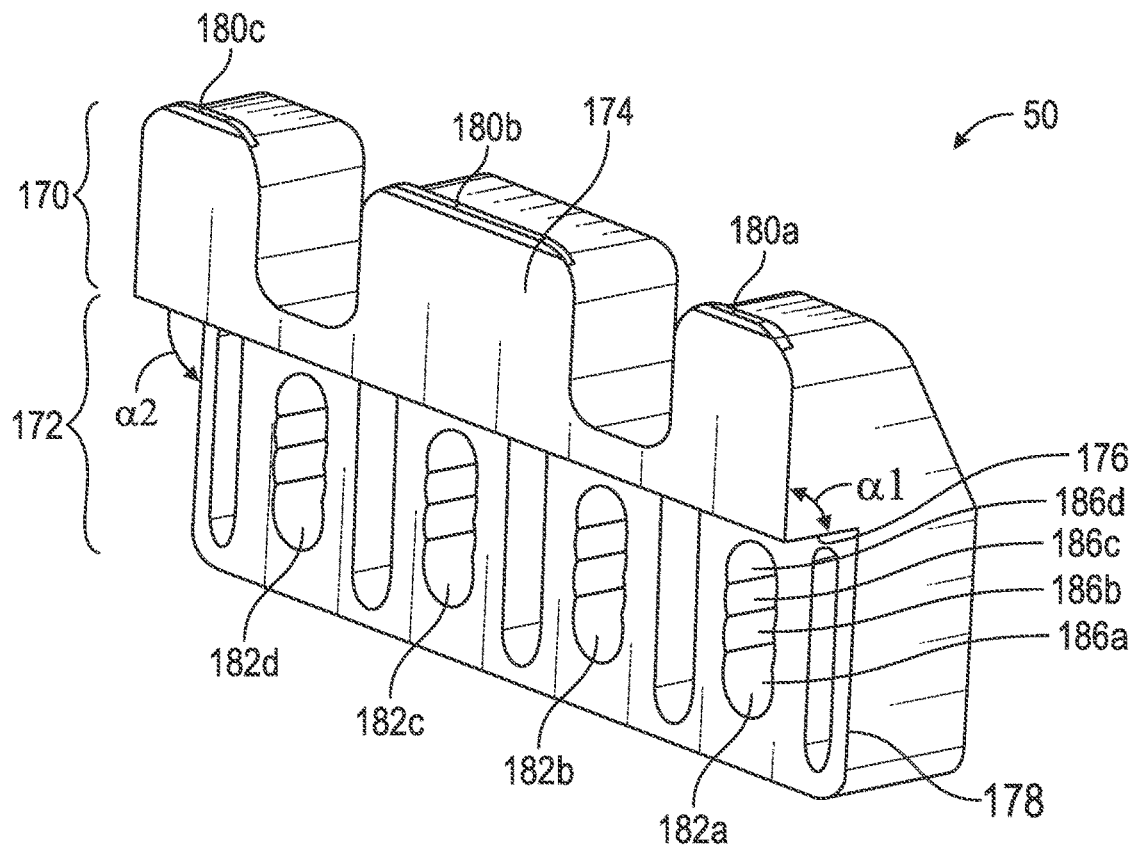
FIG. 14 is a right-side perspective view of a clamp structure of the elevator guide rail block assembly of FIG. 2.

Referring now to FIGS. 2, 4, 14 and 15, the clamp structure 50 includes an upper segment 170 and a lower segment 172. The upper segment 170 includes a first face 174. In an installed arrangement, the first face 174 is configured to align with the support elements 66*a*-66*c* in a parallel orientation in a manner such as to form opposing clamping surfaces. While the embodiment of the first face 174 shown in FIG. 14 is illustrated as a continuous surface, it should be appreciated that in other embodiments, the first face 174 can have the form of a plurality of discontinuous surfaces, sufficient to align with the support elements 66*a*-66*c* in a parallel orientation in a manner such as to form opposing clamping surfaces.

Referring again to FIGS. 2, 14 and 15, the upper segment 170 of the clamp structure 50 includes a second face 176. The second face 176 is configured to slidably seat against the first face 54 of the base element 52 to facilitate the clamping action of the first face 174 and the support elements 66*a*-66*c*. The second face 176 forms an angle $\alpha 1$ with the first face 174. In the illustrated embodiment, the angle $\alpha 1$ is about 90°. In alternate embodiments, the angle $\alpha 1$ can be more or less than about 90°, sufficient that the second face 176 is configured to slidably seat against the first face 54 of the base element 52 to facilitate the clamping action of the first face 174 and the support elements 66*a*-66*c*.

Referring again to FIGS. 2, 14 and 15, the lower segment 172 of the clamp structure 50 includes a third face 178. The third face 178 is configured to seat against the first side 58 of the base element 52 to facilitate the clamping action of the first face 174 and the support elements 66a-66c. The third face 178 forms an angle α2 with the second face 176. In the illustrated embodiment, the angle α2 is about 90°. In alternate embodiments, the second angle α2 can be more or less than about 90°, sufficient that the second face 176 is configured to slidably seat against the first face 54 of the base element 52 to facilitate the clamping action of the first face 174 and the support elements 66a-66c.

Figure 15:
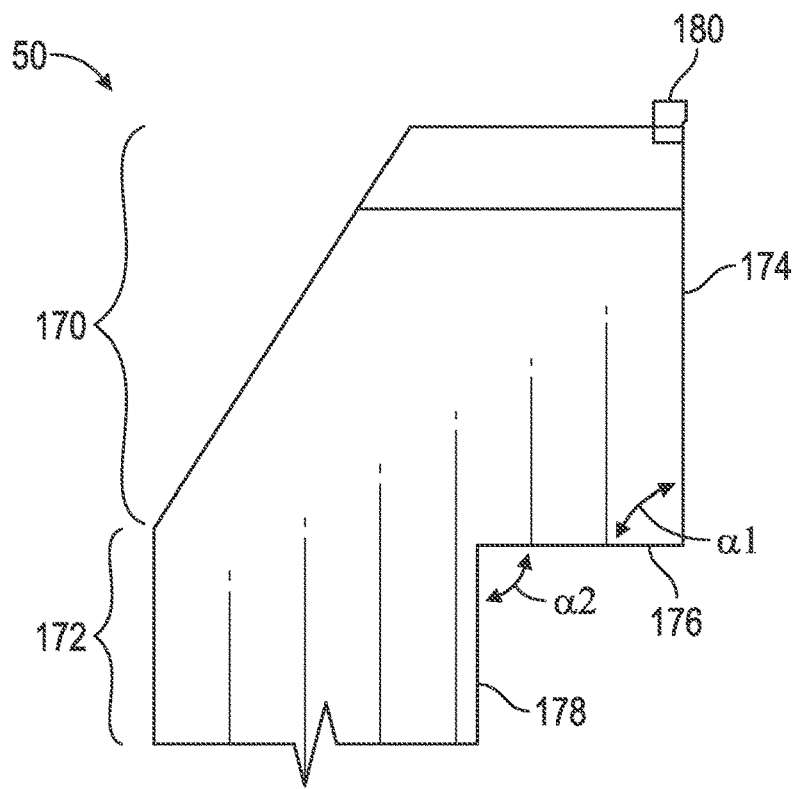
FIG. 15 is a front view of a portion of the clamp structure of FIG. 14.

Referring now to FIGS. 14 and 15, an upper portion of the first face 174 includes a plurality of lip segments 180a-180c. The lip segments 180a-180c are axially aligned with each other. The lip segments 180a-180c extend in a direction perpendicular to and beyond the first face 174. As will be explained in more detail below, the lip segments 180a-180c are configured to seat against and secure a car or counterweight guide rail. While the lip segments 180a-180c are shown in FIG. 14 as discontinuous segments, it is contemplated that in other embodiments, the lip segments 180a-180c can be formed as a continuous segment.

Referring now to FIGS. 6 and 14, the lower segment 172 of the clamp structure 50 includes a plurality of spaced apart slots 182a-182d. Each of the slots 182a-182d is configured to receive a fastener 184 configured to secure the claim structure 50 to the base element 52 of the framework 42. In the embodiment illustrated in FIG. 14, each of the slots 182a-182d is segmented into a plurality of apertures 186a-186d. Each of the apertures 186a-186d is configured for use with a car or counterweight guide rail having a certain size.

While the embodiment of the clamp structure 50 shown in FIGS. 14 and 15 is represented as a unitary body, in other embodiments, the clamp structure 50 can be formed from discrete components that are assembled together.

Figure 4:
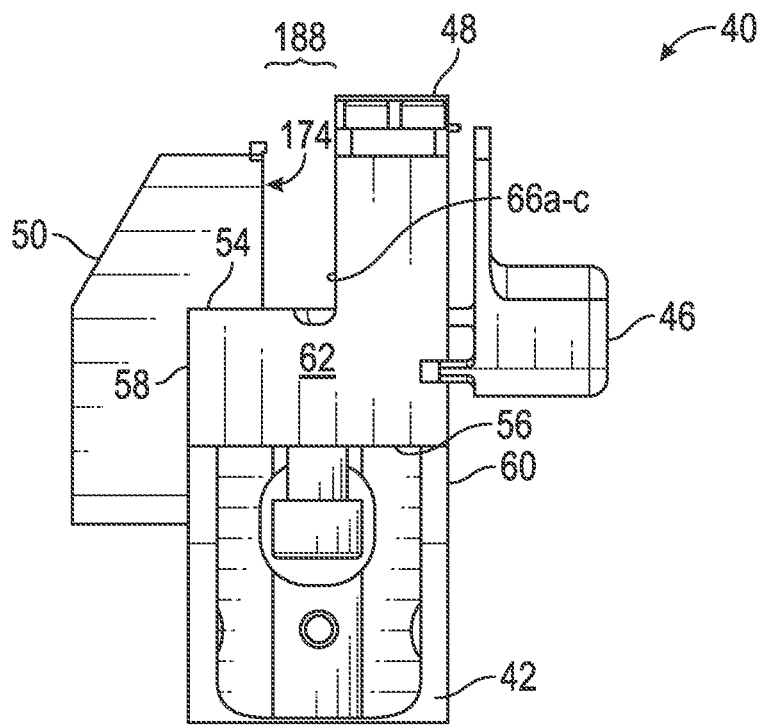
FIG. 4 is a front view of the elevator guide rail block assembly of FIG. 1.
Figure 5:
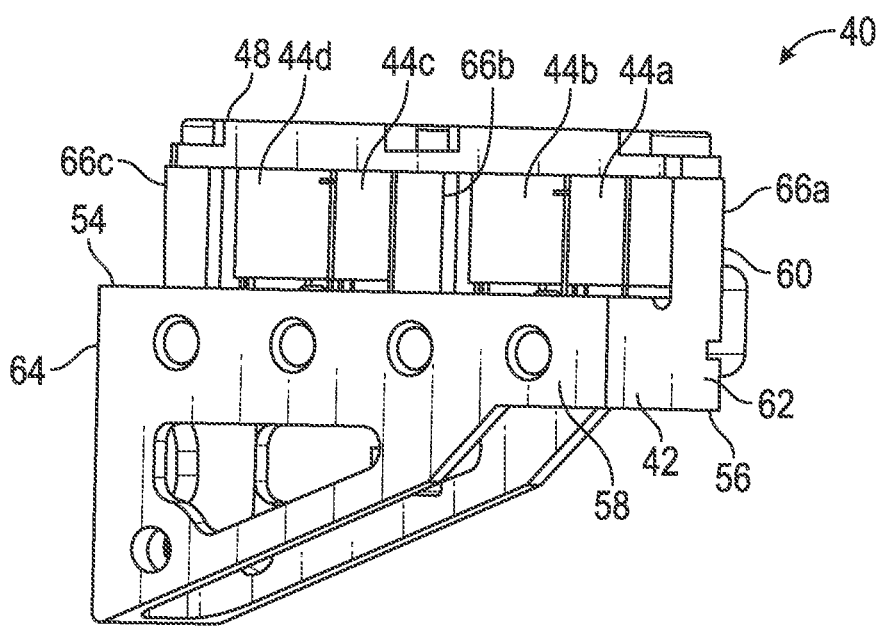
FIG. 5 is a right-side perspective view, partially in cut away, of a framework of the elevator guide rail block assembly of FIG. 1.
Figure 16:
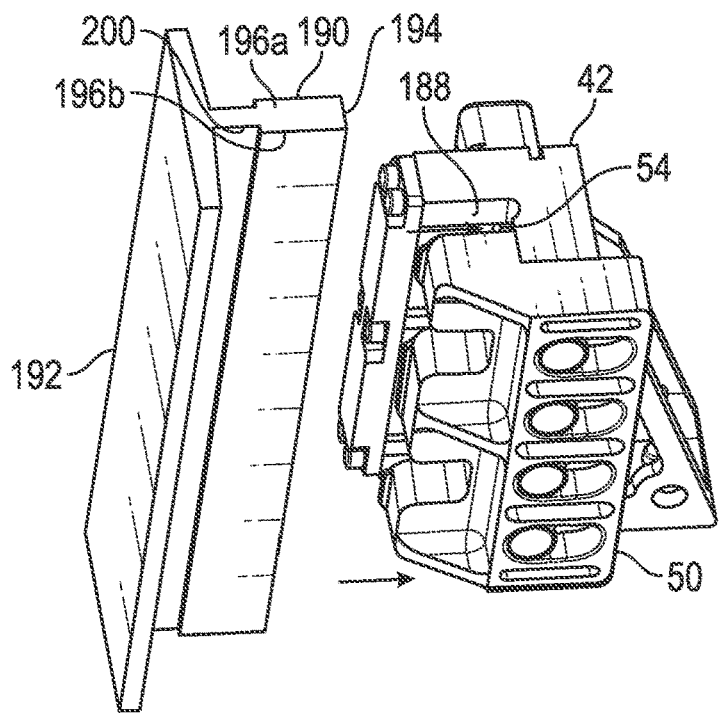
FIG. 16 is a side perspective view of the elevator guide rail block assembly of FIG. 2 engaging an elevator guide rail.
Figure 17:
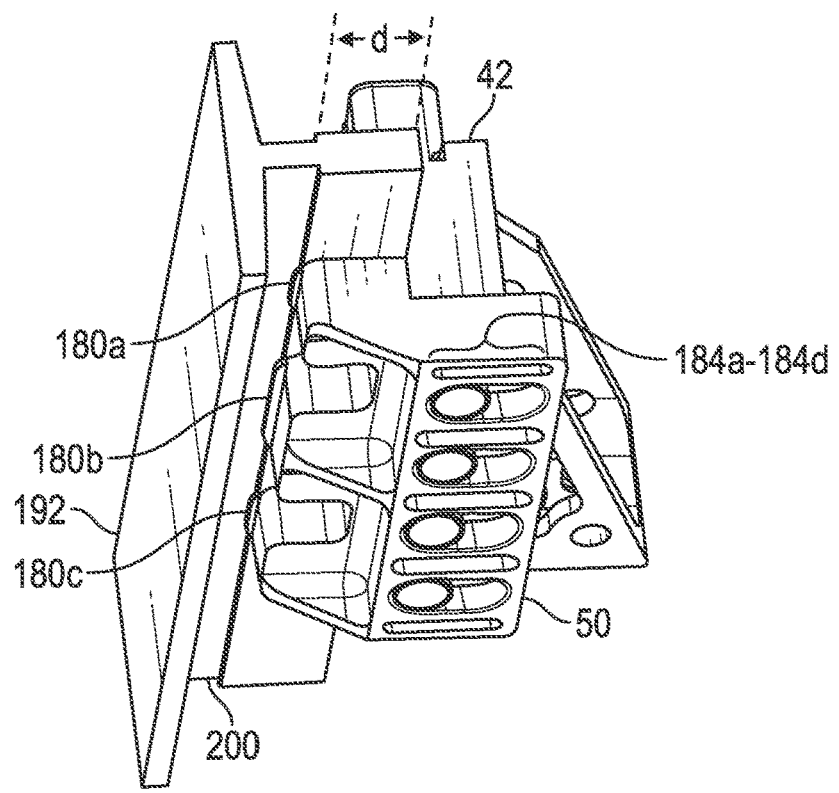
FIG. 17 is a side perspective view of the elevator guide rail block assembly of FIG. 16 shown in an installed position with the elevator guide rail of FIG. 16.

Referring now to FIGS. 4, 16 and 17, installation of the block assembly 40 will now be described. In a first step, a gap 188 formed between the support elements 66a-66c of the framework 42 and the first face 174 of the clamp structure 50 is aligned with a flange 190 of a car or counterweight guide rail 192. In a next step, the block assembly 40 is seated on the flange 190 in a manner such that a front face 194 of the car or counterweight guide rail 192 seats against the first face 54 of the framework 42. Next, as the front face 194 of the car or counterweight guide rail 192 seats against the first face 54, the front face 194 engages the mounded portion 166 of the actuation springs 154. In a next step, the engagement of the mounded portion 166 of the actuation springs 154 forces the actuation springs 154 in a direction away from the cams 44a-44c, thereby resulting in the upward segment 164 of the actuation springs 154 clearing the cutouts 120 formed in the second end of the cams 44a-44d. Next, once the actuation springs 154 have cleared the cutouts 120, the cams 44a-44d can be rotated by linear movement of the first and second support segments 134, 140. In a next step, as the cams 44a-44c are rotated, the gap 188 is closed in a manner such that a clamping action occurs by the combination of the cam lobes 107 and the first face 174 of the clamp structure 50. The cams 44a-44d can be rotated until the protrusions 118 extending from the second end of the cams seat at the end of the arcuate recesses 90a, 90b. Next, once the cam lobes 107 and the first face 174 of the clamp structure 50 are seated against side faces 196a, 196b, the lip segments 180a-180c engage a shoulder 200 formed in the car or counterweight guide rail 192.

Referring now to FIGS. 16 and 17, as previously described, the apertures 184a-184d are configured to adjust a distance d of the lip segments 180a-180c from the first face 54 of the base element 52 for use with a car or counterweight guide rail having different sizes. Advantageously, the block assembly 40 is configured for application with various sizes of elevator car and counterweight guide rails 192, including the non-limiting examples of the standard sizes of 6 lb., 8 lb., 12 lb., 15 lb., 18 lb., 22 lb., and 30 lb. Alternatively, the block assembly 40 can cooperate with other sizes of elevator guide rails 192. It is further contemplated that the block assembly 40 can be configured for elevator car and counterweight guide rails having non-traditional cross-sectional profiles.

Figure 18:
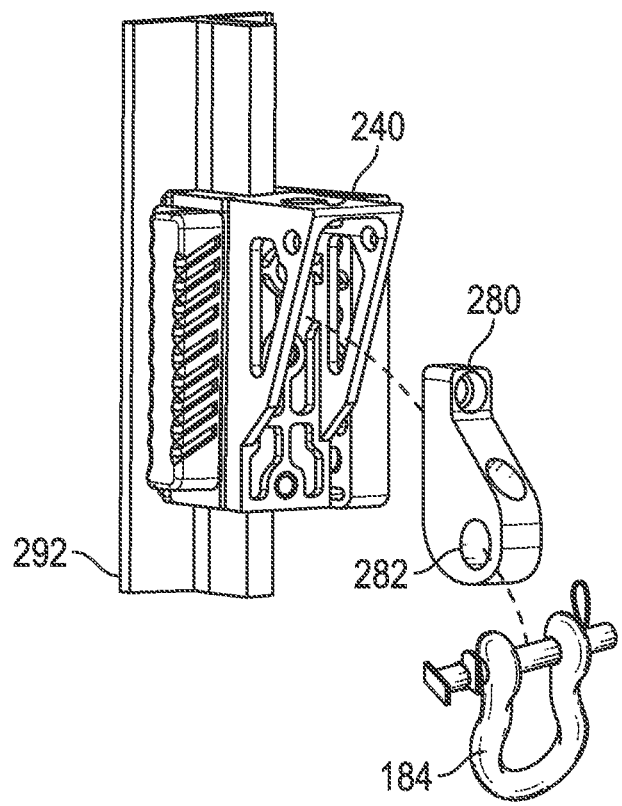
FIG. 18 is a side perspective view of the elevator guide rail block assembly and elevator guide rail of FIG. 17, shown equipped with a clevis configured for hoisting.

It is contemplated that the block assembly 40 can be employed for many uses. Non-limiting examples of a few of the uses will be described herein. Referring now to FIG. 18, a first non-limiting example is shown. In this example, the block assembly 240 is fitted with a shackle attachment 280. The shackle attachment 280 includes one or more apertures 282 configured to receive a variety of attachments, including the non-limiting example of a clevis 284. In this manner the rail block 240, combined with the shackle 280, can be used to temporarily hoist, hang or suspend elements from the car or counterweight guide rails 292.

Figure 19:
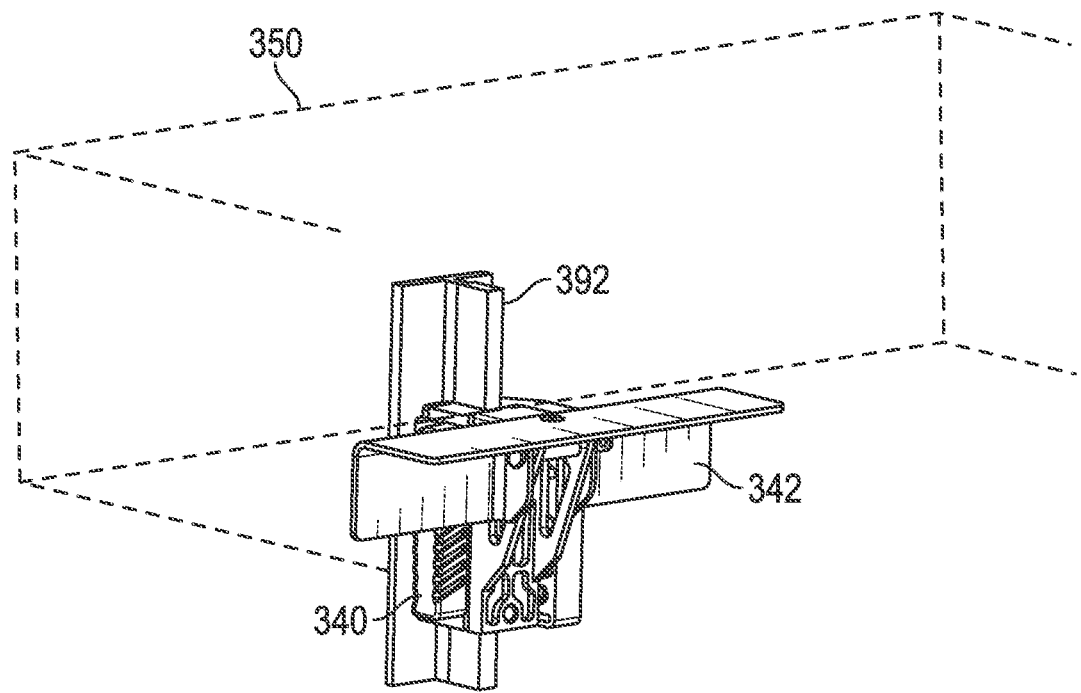
FIG. 19 is a side perspective view of the elevator guide rail block assembly and elevator guide rail of FIG. 17, shown equipped with a structural member configured for supporting a landed load.

Another non-limiting use is shown in FIG. 19. A block assembly 340 is fitted with a structural member 342. The structural member 342 can be configured as a platform for building an elevator car (shown schematically at 350). The structural member 342 can also be used as a support for hoisting, hanging or suspending elements from the car or counterweight guide rails 392. In the embodiment illustrated in FIG. 19, the structural member 342 has the form of a section of angle iron with one leg of the angle oriented in a downward direction and an exterior flat portion of the opposing leg having a substantially horizontal orientation. However, in other embodiments other structural members having other shapes, configurations and sizes can be used. The structural member 342 can have any desired length.

While the illustrated embodiments utilize a lone block assembly, 40, it is contemplated that multiple block assemblies can be used in cooperation with each other. In one non-limiting scenario, block assemblies can be positioned on the same car or counterweight guide rail and can be coupled to each other in a manner such as to allow movement of one of the block assemblies while simultaneously supporting a load with the other block assembly. In this manner, a load can be "walked" along the guide rail to another location. In another non-limiting example, a first block assembly can be positioned on a car or counterweight guide rail and a second block assembly can be positioned on an opposing car or counterweight guide rail. Once the opposing block assemblies are in position, structures can be positioned to span the opposing block assemblies. The structures can then be used to temporarily hang, suspend and/or hoist elements as desired.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An elevator guide rail block assembly configured for use with an elevator car or counterweight guide rail, the elevator guide rail block assembly comprising:
   a framework, the framework having a plurality of spring recesses positioned in a first face of a base element;
   a plurality of rotatable cams attached to the framework;
   an actuator element configured to actuate rotation of the plurality of rotatable cams; and
   a clamp structure attached to the framework and spaced apart from the plurality of rotatable cams;
   wherein each of the spring recesses is configured to receive an actuation spring configured to selectively prevent or allow rotation of the plurality of rotatable cams;
   wherein in a rotated orientation, the combination of the plurality of rotatable cams and the clamp structure form a clamping action configured to secure the elevator guide rail block assembly to the elevator car or counterweight guide rail.

2. The elevator guide rail block assembly of claim 1, wherein each of the actuation springs includes a mounded portion configured for contact with the elevator car or counterweight guide rail.

3. The elevator guide rail block assembly of claim 1, wherein each of the plurality of rotatable cams includes a cutout configured for contact with the actuation spring.

4. An elevator guide rail block assembly configured for use with an elevator car or counterweight guide rail, the elevator guide rail block assembly comprising:
   a framework;
   a plurality of rotatable cams attached to the framework, each of the plurality of rotatable cams including a protrusion configured to limit rotation of the rotatable cam;
   an actuator element configured to actuate rotation of the plurality of rotatable cams;
   a clamp structure attached to the framework and spaced apart from the plurality of rotatable cams;
   wherein in a rotated orientation, the combination of the plurality of rotatable cams and the clamp structure form a clamping action configured to secure the elevator guide rail block assembly to the elevator car or counterweight guide rail.

5. The elevator guide rail block assembly of claim 1, wherein the actuator element includes a plurality of arms, each of the arms having an aperture configured to engage a pin extending from each of the rotatable cams.

6. The elevator guide rail block assembly of claim 1, wherein the actuator element includes a rail configured for slidable engagement with a slot located in the framework.

7. The elevator guide rail block assembly of claim 1, wherein the clamp structure includes a first face configured to form a gap with the plurality of rotatable cams.

8. The elevator guide rail block assembly of claim 7, wherein the first face includes one or more lip segments configured for engagement with a shoulder formed in the elevator car or counterweight guide rail.

9. The elevator guide rail block assembly of claim 7, wherein the clamp structure is adjustable to accommodate elevator car or counterweight guide rails having different sizes.

10. A method of using an elevator guide rail block assembly configured for use with an elevator car or counterweight guide rail, the method comprising the steps of:
    aligning a gap formed in the elevator guide rail block assembly with a flange of an elevator car or counterweight guide rail, the gap formed between a plurality of rotatable cams arranged in a framework and a clamp structure abutting the framework;
    positioning a plurality of spring recesses in a first face of a base element of the framework;
    engaging the flange of elevator car or counterweight guide rail with the elevator guide rail block assembly in a manner such that the elevator car or counterweight guide rail seats against the framework;
    clamping the flange of the elevator car or counterweight guide rail between the plurality of rotated cams and the clamp structure thereby securing the elevator guide rail block assembly to the elevator car or counterweight guide rail.

11. The method of claim 10, including the step of selectively preventing or allowing rotation of the plurality of rotatable cams with an actuation spring positioned in each of the plurality of spring recesses.

12. The method of claim 11, including the step of contacting a mounded portion each of the actuation springs with the elevator car or counterweight guide rail.

13. The method of claim 11, including the step of forming a cutout in each of the plurality of rotatable cams, the cutout configured for contact with the actuation spring.

14. The method of claim 10, including the step of limiting rotation of each of the plurality of rotatable cams with a protrusion extending from each of the plurality of rotatable cams.

15. The method of claim 10, including the step of engaging a pin extending from each of the plurality of rotatable cams with a plurality of arms extending from the actuator element.

16. The method of claim 10, including the step of forming a gap between a first face of the clamp structure and the plurality of rotatable cams.

17. The method of claim 16, including the step of engaging a shoulder formed in the elevator car or counterweight guide rail with one or more lip segments formed in the first face of the clamp structure.

* * * * *